United States Patent [19]

Lefevre

[11] Patent Number: 4,562,015

[45] Date of Patent: Dec. 31, 1985

[54] OPEN MESH FILL ASSEMBLY

[75] Inventor: Marcel R. Lefevre, Ft. Myers, Fla.

[73] Assignee: The Munters Corporation, Ft. Myers, Fla.

[21] Appl. No.: 612,923

[22] Filed: May 22, 1984

[51] Int. Cl.$^4$ .............................................. B01F 3/04
[52] U.S. Cl. ...................................... 261/94; 55/240; 261/112; 261/DIG. 11; 261/DIG. 72
[58] Field of Search ................ 261/94, 112, DIG. 11, 261/DIG. 72; 29/157 R, 163.5 R; 55/240

[56] References Cited

U.S. PATENT DOCUMENTS

| | | |
|---|---|---|
| 2,003,271 | 5/1935 | Beimann et al. ..................... 261/111 |
| 2,356,653 | 8/1944 | Cox ..................................... 261/111 |
| 2,470,652 | 5/1949 | Scofield ................................ 261/94 |
| 2,630,305 | 3/1953 | Scofield et al. ........................ 261/94 |
| 2,955,064 | 10/1960 | Frohmader ........................ 261/94 X |
| 3,010,706 | 11/1961 | McWilliams ...................... 261/94 X |
| 3,262,682 | 7/1966 | Bredberg .......................... 261/112 X |
| 3,346,246 | 10/1967 | Loetel et al. ..................... 261/112 X |
| 3,389,895 | 6/1968 | DeFlon ............................... 261/111 |
| 3,430,934 | 3/1969 | Weishaupt ............................. 261/94 |
| 3,799,512 | 3/1974 | Raybon ........................... 261/111 X |
| 4,028,442 | 6/1977 | Eckert ................................. 261/94 |
| 4,128,684 | 12/1978 | Bomio et al. ..................... 261/112 X |
| 4,297,154 | 10/1981 | Keller .......................... 29/163.5 R X |
| 4,304,738 | 12/1981 | Nutter .................................. 261/94 |
| 4,338,266 | 7/1982 | Flower ............................ 261/112 X |

FOREIGN PATENT DOCUMENTS

| | | | |
|---|---|---|---|
| 2032292 | 4/1971 | Fed. Rep. of Germany ...... 261/112 |
| 2060178 | 11/1971 | Fed. Rep. of Germany ...... 261/112 |
| 734874 | 8/1955 | United Kingdom .................. 261/94 |
| 942536 | 11/1963 | United Kingdom ................ 261/112 |
| 973746 | 10/1964 | United Kingdom ................ 261/112 |

Primary Examiner—Richard L. Chiesa

[57] ABSTRACT

A gas/liquid fill assembly for use in an evaporative cooling tower, chemical scrubbing apparatus or other device includes a plurality of facially-opposed corrugated sheets of material disposed in a substantially vertical, parallel relationship. The corrugations of each sheet are disposed at an angle to the horizontal with each of the corrugations extending continuously in substantially straight lines from one edge of the sheets to another edge. The corrugations in alternate sheets cross the corrugations in the sheets disposed between the alternate sheets. Adjacent corrugated sheets form channels to allow a gas and gravitating liquid to pass through the fill assembly. The sheets are formed of a foraminous material comprising an open-mesh network of interconnected webs. The interconnected webs are arranged to define a plurality of polygonally shaped openings. Each opening is symmetrically formed about an axis thereof and arranged within the sheet material so that its axis of symmetry is oriented substantially in the direction of maximum slope. The polygonally shaped openings in the sheets cause the gravitating liquid to divide around the openings and travel along the interconnecting webs whereby the liquid is distributed over the surfaces of the sheets.

5 Claims, 5 Drawing Figures

OPEN MESH FILL ASSEMBLY

BACKGROUND OF THE INVENTION

1. Field of the Invention

This invention relates to a gas/liquid fill assembly for use in a heat exchanging cooler, such as an evaporative cooling tower, or generally for use in other devices which require a body to effect the contact of a gas with a liquid, such as in a chemical scrubbing apparatus. More particularly, this invention relates to a fill assembly which is composed of layers or sheets made with folds or corrugations between which channels or passageways penetrating through the fill assembly are formed. The gas and liquid are caused to act upon one another during their passage through the channels, such action being performed under cross-flow or counter-flow. In a heat exchanger, the interaction of the gas and liquid causes the gas to be moistened and the liquid to be cooled.

2. Description of the Prior Art

Fill assemblies comprising parallelly disposed sheets have long been recognized in the art as an effective gas/liquid contact body for heat exchanging cooling towers.

The sheets may be corrugated as disclosed in U.S. Pat. No. 3,262,682, issued July 26, 1966 to Sven Bredberg. The corrugations help to distribute the liquid gravitating through the fill assembly. They also cause the gas to flow in a circuitous path through the assembly thereby resulting in greater gas/liquid contact and increased cooling efficiency.

A fill assembly made of expanded metal or expanded polyvinyl chloride sheets is also known in the art, as illustrated by U.S. Pat. No. 3,346,246, issued Oct. 10, 1967 to Charles Loetel et al. As described in the '246 specification, the sheets are formed with diamond-shaped openings having their major axes disposed either vertically or horizontally.

OBJECTS AND SUMMARY OF THE INVENTION

It is an object of the present invention to provide a gas/liquid fill assembly, for use in a heat exchanging cooler, chemical scrubber or other device, with increased liquid distribution capability.

It is another object of the present invention to provide a gas/liquid fill assembly which presents relatively little resistance to the gas flowing through the device in which the assembly is used.

It is a further object of the present invention to provide a gas/liquid fill assembly which is of relatively lightweight construction.

It is a still further object of the present invention to provide a gas/liquid fill assembly for a heat exchanging unit having relatively high cooling efficiency with much less sheet material than conventional fill assemblies.

In accordance with the present invention, it has been found that increased liquid distribution and, in the case of a heat exchanger, greater cooling efficiency can be achieved by providing corrugated sheets of a fill assembly with a multiplicity of polygonally shaped openings, and orienting these openings in such a manner that their axes of symmetry are aligned in the direction of maximum slope. More specifically, the fill assembly for an evaporative cooling tower, chemical scrubbing apparatus or other device includes a plurality of facially-opposed corrugated sheets of material disposed in a substantially vertical, parallel relationship. The corrugations of each sheet are disposed at an angle to the horizontal with each of the corrugations extending continuously in substantially straight lines from one edge of the sheets to another edge. The corrugations in alternate sheets are positioned at an angle to and therefore cross the corrugations in the sheets disposed between the alternate sheets. Adjacent corrugated sheets form channels to allow a gas such as air and gravitating liquid such as water to pass through the fill assembly.

The sheets are formed of a foraminous material comprising an open-mesh network of interconnected webs. The interconnected webs are arranged to define a plurality of polygonally shaped openings. Each opening is dimensioned to prevent the gravitating liquid from filming thereacross and is symmetrically formed about an axis thereof. The openings are arranged so that their axes of symmetry are oriented substantially in the direction of the maximum slope of the sheet surface. The polygonally shaped openings in the sheets cause the gravitating liquid, which on solid sheets would tend to flow in the direction of maximum slope, to divide around the openings and travel along the interconnecting webs whereby the liquid is distributed over the surfaces of the sheets.

These and other objects, features and advantages of this invention will be apparent in the following detailed description of the illustrative embodiments thereof, which are to be read in connection with the accompanying drawings.

BRIEF DESCRIPTION OF THE DRAWINGS

The invention may be better understood by reference to the following detailed description, taken in conjunction with the accompanying drawings, in which.

DETAILED DESCRIPTION OF THE PREFERRED EMBODIMENTS

Figure 1:
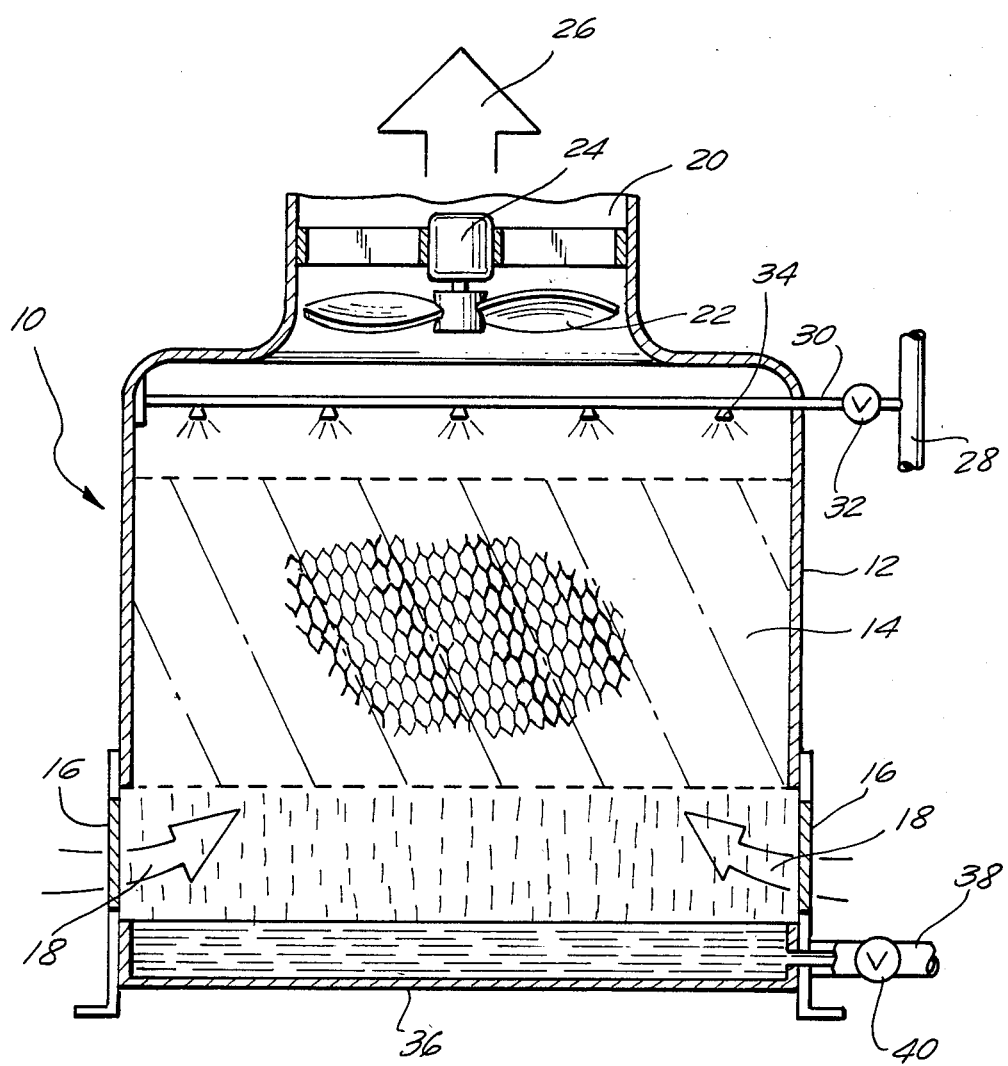
FIG. 1 illustrates a vertical section through an evaporative cooler, such as a cooling tower of the counter-current type, to which the invention has been applied.

Referring now to the drawings in detail and initially to FIG. 1 thereof, it will be seen that a fill assembly constructed in accordance with the present invention is disposed within a cooling tower 10. The cooling tower illustrated in FIG. 1 is designed for cooling heated water from a power plant, for example, by exposing the water to flowing air.

Cooling tower 10 comprises a casing 12 which houses the open mesh fill assembly 14 of the present invention. Casing 12 has lateral openings 16 formed on opposite sides thereof for admitting atmospheric air in the direction of arrows 18. An air discharge opening 20 is formed in the top of casing 12 and has an impeller 22 driven by a motor 24, mounted therein. Impeller 22 thus draws atmospheric air into casing 12 through lateral openings 16. The air then flows in a mainly vertical direction upwards through the open mesh fill 14, as indicated by the arrow 26, to opening 20.

A water distributing system is positioned in casing 12 above the fill assembly 14. This system includes a main pipe 28 and branch pipes 30, only one of which is illustrated. Branch pipes 30 are equipped with valves 32 to control the flow of water supplied to the fill assembly. The branch pipes may open into a trough (not shown) positioned above the fill assembly 14 and having a perforated bottom for downward flow of the water into the open mesh fill assembly. Alternatively, the branch pipes may include spaced apart distribution nozzles or sprayers 34 for providing gravitating water to the fill assembly.

The cooled water which has passed through the open mesh fill assembly 14 is collected in a sump 36 at the bottom of the cooling tower and is discharged through a pipe 38 controlled by a valve 40 to the place of utilization. Upon renewed heating at the place of utilization, the water is returned through the main pipe 28 to the cooling tower to be supplied to the open mesh fill assembly 14. The water flows in a downward direction through the fill assembly and there meets the upwardly advancing air. Exposure of the water to the air cools the water and the air takes up moisture until it is saturated.

The cooling tower 10 illustrated in FIG. 1 thus provides a counter-flow between the water and air. However, the open mesh fill assembly of the present invention is also quite adaptable for use in a cooling tower of cross-flow configuration where, for example, intake and discharge openings are positioned in the sidewalls of the casing at opposite side edges of the sheets comprising the fill assembly.

Although the fill assembly is illustrated in FIG. 1 as being used in a heat exchanging cooling tower, it may be readily used in other devices as well. For example, the fill assembly may be used in a chemical scrubbing apparatus such as an anti-pollution device to remove sulfur dioxide or other environmentally harmful gases before these gases are discharged into the atmosphere, or in a condensing or distillation column.

Figure 2:
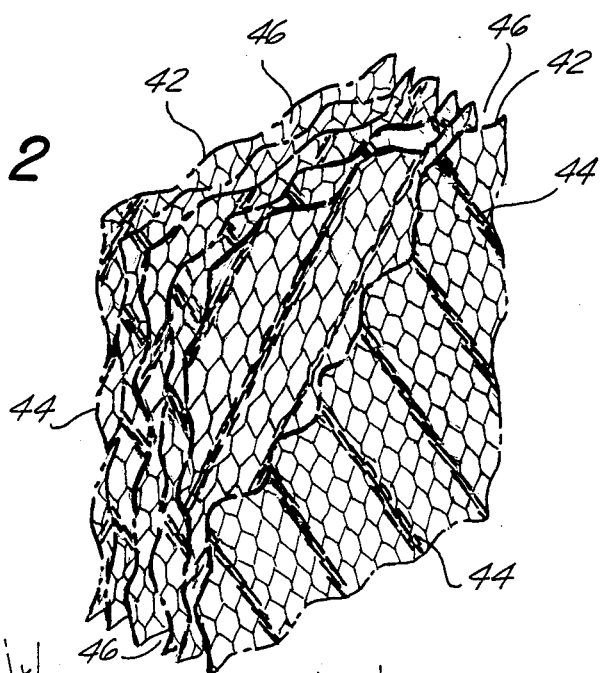
FIG. 2 is an isometric view of the fill assembly constructed in accordance with the present invention.
Figure 3:
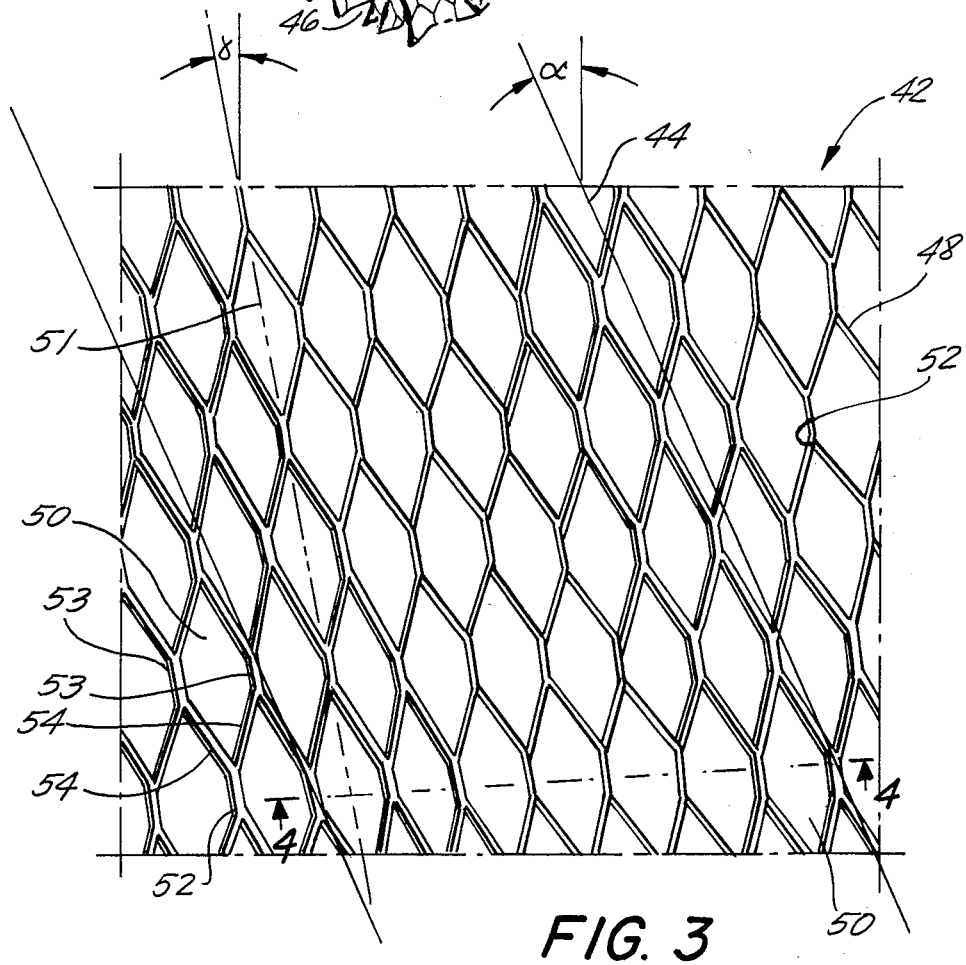
FIG. 3 is a side view of one of the corrugated sheets forming the fill assembly.
Figure 4:
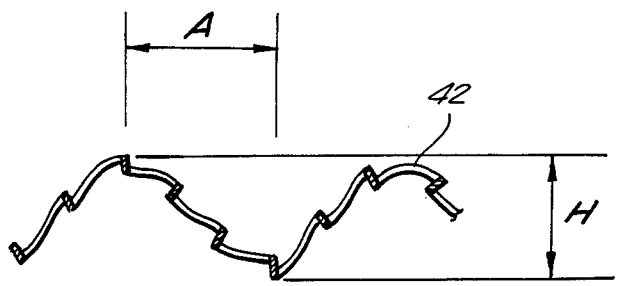
FIG. 4 is a sectional view of the sheet shown in FIG. 3 taken along lines 4—4.

With reference now to FIGS. 2 through 4 of the drawings, the open mesh fill assembly of the present invention includes a plurality of thin corrugated layers or sheets 42 disposed vertically and parallel to one another. The corrugations 44 extend at an oblique angle, such as 45° relative to the horizontal plane. Each of the corrugations 44 preferably extends continuously in substantially straight lines from one edge of the sheet to another edge thereof or extends at least partially between the edges of the sheets. Thus, adjacent corrugated sheets 42 form passages or channels 46 penetrating through the fill assembly from the top of the assembly to the bottom or from side to side. A liquid and a gas, such as water and air, flow in the channels 46 provided, as illustrated in FIG. 1 of the drawings.

Liquid gravitating from the distribution system above the fill assembly 14 will strike the corrugated surfaces of the sheets 42 and the corrugations 44 will impart a lateral component to the liquid flow. The liquid is thereby urged by gravity and the shape of the fill to flow at an angle to the vertical in a direction which can be mathematically defined, as described hereinafter, and which is referred to as the direction of maximum slope. As will become more apparent, the direction of maximum slope is very important to the construction of the open mesh fill assembly of the present invention.

The direction of maximum slope resides between the vertical and the fluting angle. The latter is the angle from the vertical at which the corrugations 44 are disposed. The direction of maximum slope is dependent upon the fluting angle of the corrugations, the height of the corrugations measured from peak to peak, and the transverse pitch of the corrugations, i.e., the distance between corrugations as measured from peak to valley. The transverse pitch and the height of the corrugations for a typical sheet are illustrated in FIG. 4 and designated by reference symbols A and H, respectively.

The projected angle of maximum slope, $\gamma$, in a cross-fluted configuration is the angle which one skilled in the art should be concerned with when constructing the open mesh fill assembly of the present invention. The projected angle $\gamma$ is the angle of flow for the liquid to the vertical which is seen when each sheet 42 is viewed from the side, i.e., in two dimensions. This is illustrated in FIG. 3 of the drawings.

The projected angle of maximum slope is calculated from the following equation:

$$\text{Tan. } \gamma = \frac{\text{Tan. } \alpha}{1 + [A/(H \times \cos \alpha)]^2} \quad \text{(Eq. 1)}$$

where
$\gamma$ = the projected angle of maximum slope;
$\alpha$ = the fluting angle, i.e., the angle at which the corrugations are disposed from the vertical;
A = the transverse pitch of the corrugations, measured from peak to valley; and
H = the height of the corrugations, measured from peak to peak.

An example showing the calculation of the projected angle of maximum slope is now described. For a corrugated sheet having a fluting angle of 30°, and with corrugations having a pitch A and height H which are each 20 mm., from Equation 1 it can be seen that:

$$\text{Tan. } \gamma = \frac{\text{Tan. } 30}{1 + [20/(20 \times \cos 30)]^2}$$

$$= .247$$

Therefore, the angle of maximum slope, $\gamma$, equals 13.90°.

Fill assembly sheets 42 are formed of a foraminous material comprising an open-mesh network of interconnected webs 48. The interconnected webs 48 are arranged to define a plurality of polygonally shaped openings 50, as illustrated in FIG. 3 of the drawings. Each opening 50 is sufficiently large enough to prevent the gravitating liquid from filming thereacross. As a result, the gravitating liquid is distributed laterally on the sheet surfaces along the interconnecting webs 48.

Each opening 50 is formed as a six sided polygon and is symmetrical about the major axis 51. Each polygonal opening is defined by a pair of parallel webs or sides 53 (each of which is also common to an adjacent opening) and four angularly related webs or sides 54 defining nodes 52 where they join sides 53.

The openings are arranged within the sheet material so that their sides 53 and their major axes of symmetry 51 are oriented substantially in the direction of maximum slope.

On a solid, corrugated sheet droplets of the gravitating liquid would normally flow in the direction of maximum slope. By the construction of the present invention these droplets are repeatedly forced to divide and/or merge as they flow down the sheet in the direction of maximum slope. Thus, a droplet on a side 53 will, upon arriving at a nodal point 52, where two angular sides 54 join, either subdivide into smaller drops which flow down sides 54 of the next polygonally shaped opening 50 or remain whole and travel down one or the other of the following sides 54. At a nodal point 52 where sides 54 meet, the droplets on webs 54 merge to form a larger droplet that travels down a side 53 bordering another opening 50, to another node where it will subdivide again or flow onto another side 54. Accordingly, substantially equal amounts of the liquid will flow around the openings due to the shape and orientation of the sides or webs. Thus, the openings, having their axes of symmetry oriented as described, interrupt the natural flow of the liquid and divert the liquid onto the interconnecting webs 48 from nodal point to nodal point through the fill assembly. At each successively lower nodal point 52, the liquid droplets combine with droplets flowing down other webs and then redivide around successively lower openings. In this manner, the gravitating liquid is spread laterally over the surfaces of the sheets 42 as it flows downwardly through the fill assembly. This results in a more uniform redistribution of the liquid throughout the assembly, improved mixing of the liquid droplets and greater cooling efficiency.

The six-sided shape of openings 50 satisfactorily spreads the liquid across the surfaces of the fill assembly sheets. The six-sided openings may be elongated longitudinally in the direction of maximum surface slope or, if desired, they may be elongated transversely to the direction of maximum slope. It may also be desirable to make the two parallel webs or sides 53 of the six-sided opening small in comparison to the other sides 54.

Figure 5:
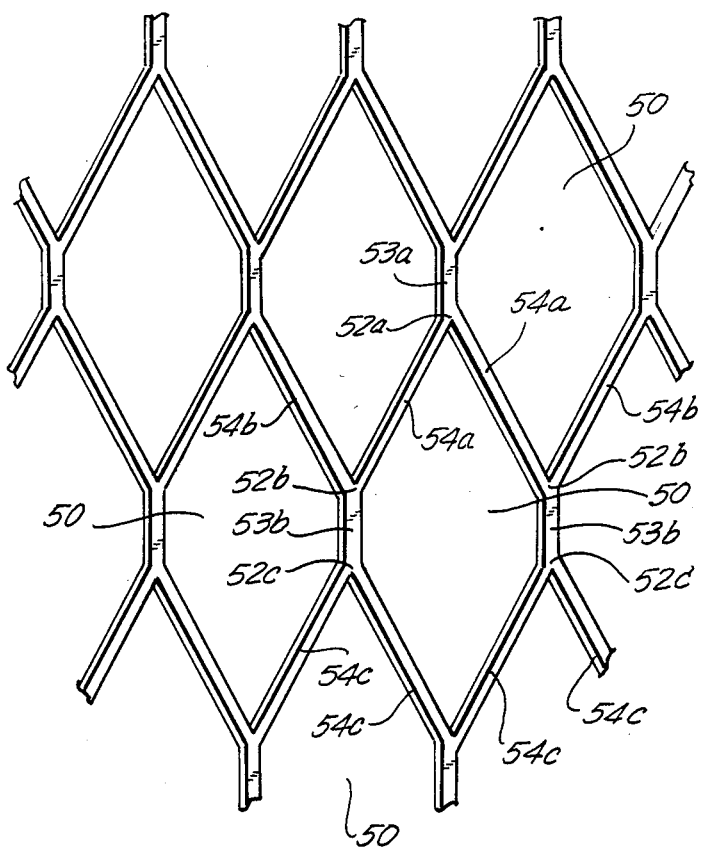
FIG. 5 is an enlarged projection of a portion of a sheet comprising the open mesh fill assembly.

FIG. 5 of the drawings illustrates how fill sheets formed in accordance with the present invention help distribute the liquid more evenly throughout the fill assembly. The gravitating liquid forms into droplets which travel along the interconnecting webs of the sheet material. For example, liquid droplets flowing down a straight web or side 53a subdivide at nodal point 52a into two smaller droplets which flow down webs or sides 54a of the next opening 50. The subdivided liquid droplet traveling along a web 54a combines with another subdivided droplet from an adjacent web 54b at their common nodal point 52b so that they merge and mix. The combined droplet then travels along the next side or web 53b until it reaches the next nodal point 52c where it subdivides into more smaller droplets which flow down the next angularly related legs 54c of the next opening 50. Because the openings have their axes of symmetry in the direction of maximum slope, the webs defining the openings provide paths of equal resistance to the flow of the liquid. Thus, the liquid will divide equally around the openings as it gravitates through the fill assembly. In this way, the liquid is both evenly distributed laterally across the surfaces of the sheets and well mixed. Even areas of the fill assembly which do not directly receive the liquid from the liquid distributing system are coated in the manner described.

The corrugated sheets 42 may be formed by first slitting and then expanding flat sheets of metal, such as stainless steel, aluminum or the like, and then corrugating the sheets at a particular fluting angle, or they may be formed of a woven wire mesh. Alternatively, the sheets of the fill assembly may be formed by extruding sheets of a plastic material such as polyvinyl chloride, die punching the sheets to form the polygonally shaped openings and then corrugating the sheets.

The open mesh fill assembly of the present invention provides excellent heat transfer and a reduced pressure drop. The amount of material necessary to manufacture the fill assembly is also reduced from that required for a conventional corrugated fill assembly. It has been estimated that the same cooling efficiency can be obtained with the open mesh fill assembly as with a conventional corrugated fill but with ten times less material. This feature is particularly important when it is necessary to manufacture the sheets from expensive materials to resist special conditions such as aggressive liquids (for example, when the fill assembly is used in a chemical scrubber), high temperatures, fire, etc. The polygonal shape and the particular orientation of the openings, with their axes of symmetry aligned in the direction of maximum slope, causes the liquid to distribute evenly and laterally throughout the fill assembly.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A fill assembly adapted to effect contact between a gas and a liquid, which comprises:
   a plurality of facially-opposed corrugated sheets of material disposed in a substantially vertical, parallel relationship, all of the corrugations in each of the sheets being disposed at an angle to the vertical, and each of the corrguations extending in substantially straight lines at least partially between one edge of the sheets and another edge thereof, with the corrugations in alternate sheets crossing the corrugations in the sheets disposed between the alternate sheets, adjacent corrugated sheets defining therebetween channels for the passage of a gas and gravitating liquid therethrough the liquid being urged by gravity to flow along the surfaces of the sheets in the direction of maximum slope, said sheets being formed of a foraminous material comprising an open-mesh network of interconnected webs, the interconnected webs being arranged to define a plurality of hexagonal openings with at least two opposite sides being parallel and disposed substantially in the direction of maximum slope, each opening being of sufficient size to prevent the gravitating liquid from filming thereacross, each opening being symmetrical about at least one axis thereof and arranged within the sheet material so that said at least one axis of symmetry is oriented substantially in the direction of maximum slope, wherein the hexagonal openings interrupt the natural flow of the liquid and cause the liquid to divide around the openings and flow along the interconnecting webs, whereby the liquid is distributed broadly over the surface of the sheets, wherein the direction of maximum slope is disposed at substantially an angle $\gamma$ from the vertical, and wherein the angle $\gamma$ is calculated from the following equation:

$$\text{Tan. } \gamma = \frac{\text{Tan. } \alpha}{1 + [A/(H \times \cos \alpha)]^2}$$

where $\gamma =$ the angle from the vertical of the direction of maximum slope;

$\alpha =$ the fluting angle, i.e., the angle at which the corrugations are disposed from the vertical;

$A =$ the transverse pitch of the corrugations, measured from peak to valley; and $H =$ the height of the corrugations, measured from peak to peak.

2. A fill assembly as defined in claim 1 wherein the sheets are formed from an expanded metal.

3. A fill assembly as defined in claim 1 wherein the sheets are formed from an extruded plastic.

4. A fill assembly as defined in claim 1 wherein the polygonally shaped openings are longitudinally elongated in the direction of maximum slop.

5. A fill assembly as defined in claim 1 wherein the corrugations are disposed at an angle from the direction of maximum slope.

* * * * *